No. 873,434. PATENTED DEC. 10, 1907.
J. T. HEPBURN.
MOTOR CAR.
APPLICATION FILED NOV. 20, 1906.
5 SHEETS—SHEET 5.

Witnesses:
P. F. Nagle.
L. Douville.

Inventor:
James Thomas Hepburn,
By Diedersheim & Fairbanks,
Attorneys.

UNITED STATES PATENT OFFICE.

JAMES THOMAS HEPBURN, OF LOCHWINNOCH, SCOTLAND.

MOTOR-CAR.

No. 873,434.    Specification of Letters Patent.    Patented Dec. 10, 1907.

Application filed November 20, 1906. Serial No. 344,299.

*To all whom it may concern:*

Be it known that I, JAMES THOMAS HEPBURN, of Braehead, Lochwinnoch, Renfrewshire, Scotland, have invented certain new and useful Improvements in Motor-Cars, of which the following is a specification.

This invention relates to motor cars of that class wherein the body or coach work rests on a frame which is so constructed as to be sufficiently flexible to run over uneven roads without unduly straining the frame or injuring the mechanism, motion being conveyed from the engine to the rear driving axle through a driving shaft and worm or bevel gearing.

In some cases it has been proposed to make a casing or frame suitably shaped for the reception of the rear driving axle and the variable speed and reversing gear and for supporting the engine, the front end of the casing or frame being supported or suspended from the body of the car and the rear end from the rear axle or, if desired, the front end of the casing may rest on a spring on the front axle while the rear end is supported on the rear axle thereby reducing vibration. It has also been proposed to use a tubular frame hinged to the front axle and suspended from the rear axle by means of trunnions said frame carrying the engine change wheels and transmission shaft between its longitudinal members and so arranged as to be free to oscillate relatively one to the other about the trunnions without putting the gear out of alinement.

The object of my invention is to provide an improved arrangement for reducing the amount of movement at the engine. Under the invention I connect the engine, gear case, and back axle casing rigidly together by means of a hollow steel tube. Down the center of the tube a straight driving shaft is taken direct from the speed reducing gear to a bevel or worm drive on the back axle. The engine and gear case are placed close to and nearly above the front axle and are supported from the axle by means of a coach spring or springs in the usual way so that the engine and gear case are not affected by the vibration of the back axle as almost their entire weight is taken by the front axle springs. The rise and fall of the back wheel or wheels due to inequalities on the road surface practically takes place round the engine as a pivot so that the movement of the back axle is inappreciable at the engine end of the system.

Figure 1:
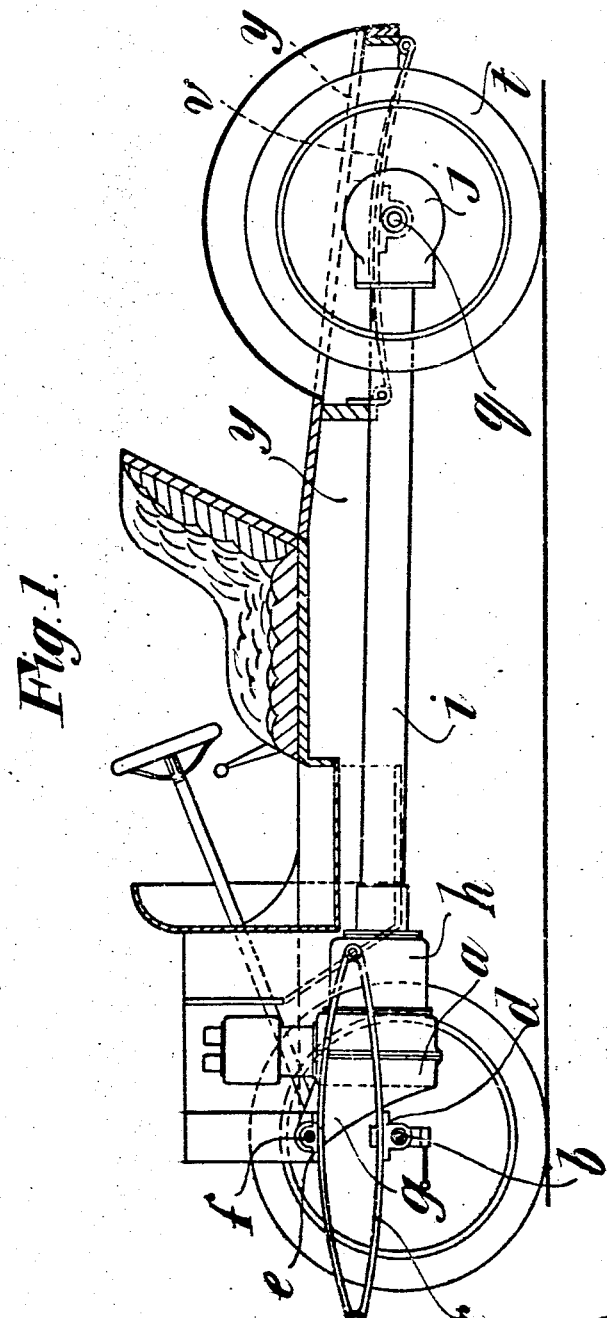
Figure 2:
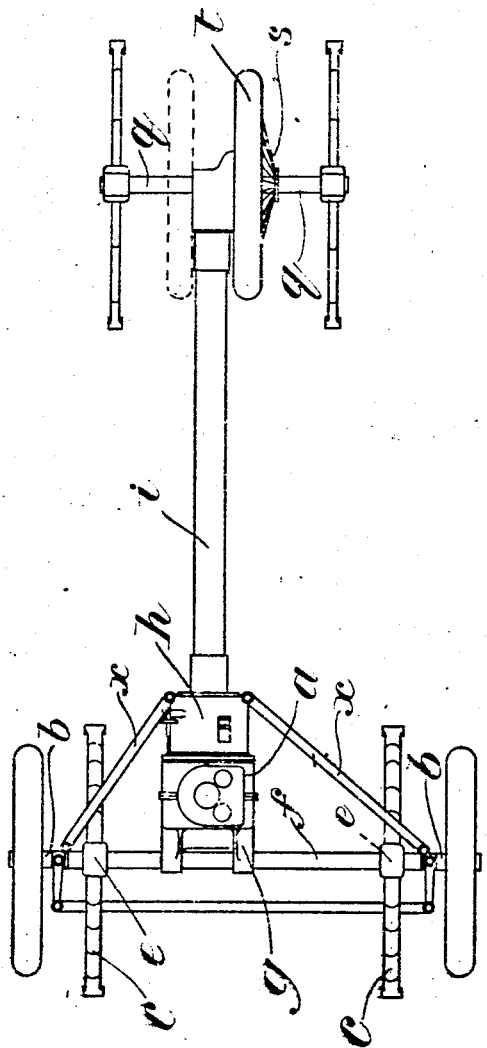
Figure 3:
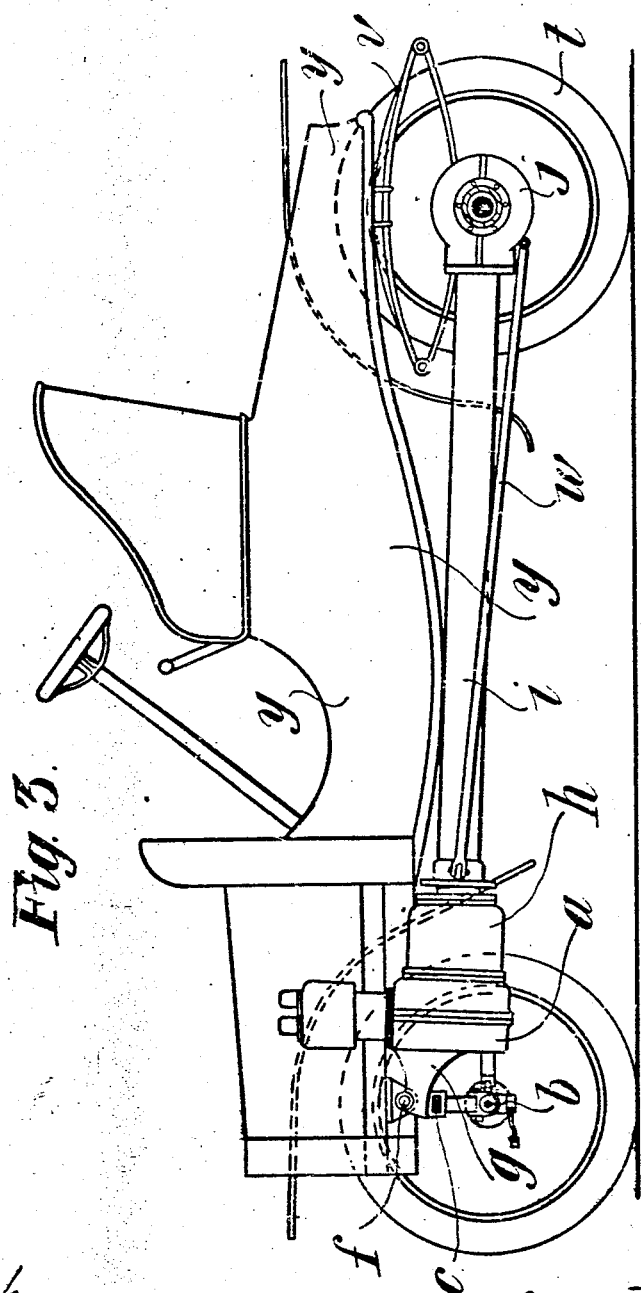
Figure 4:
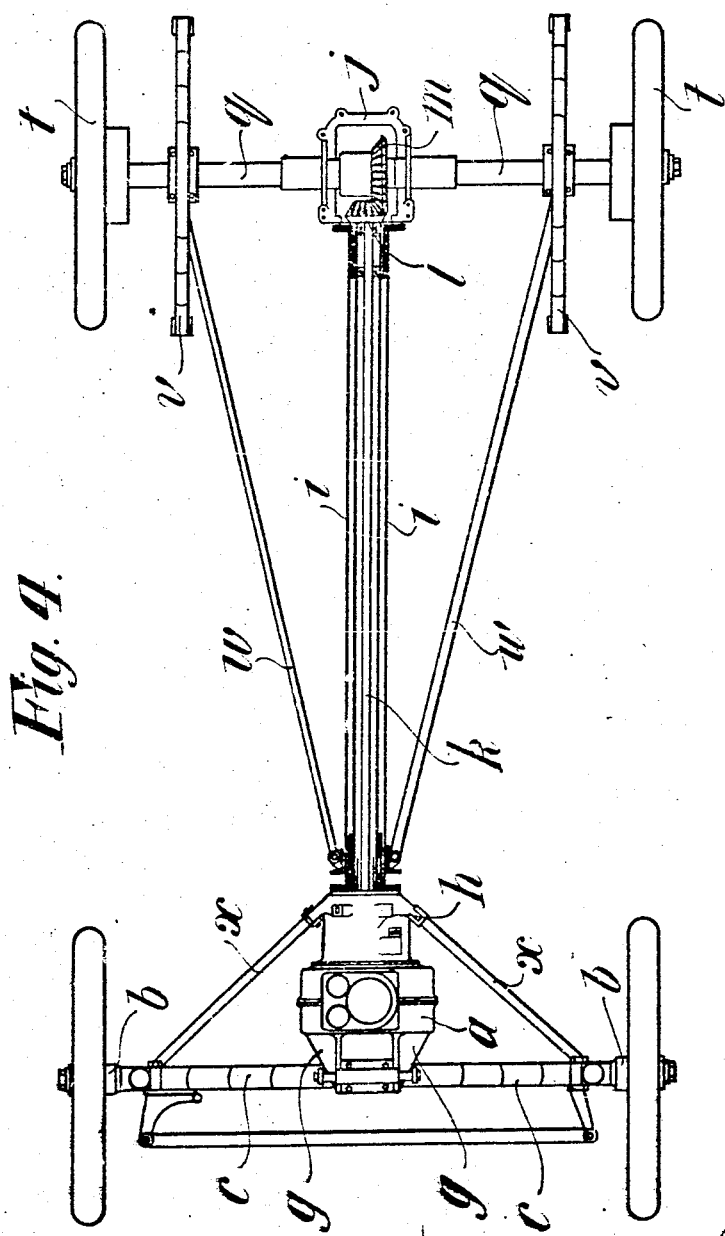
Figure 5:
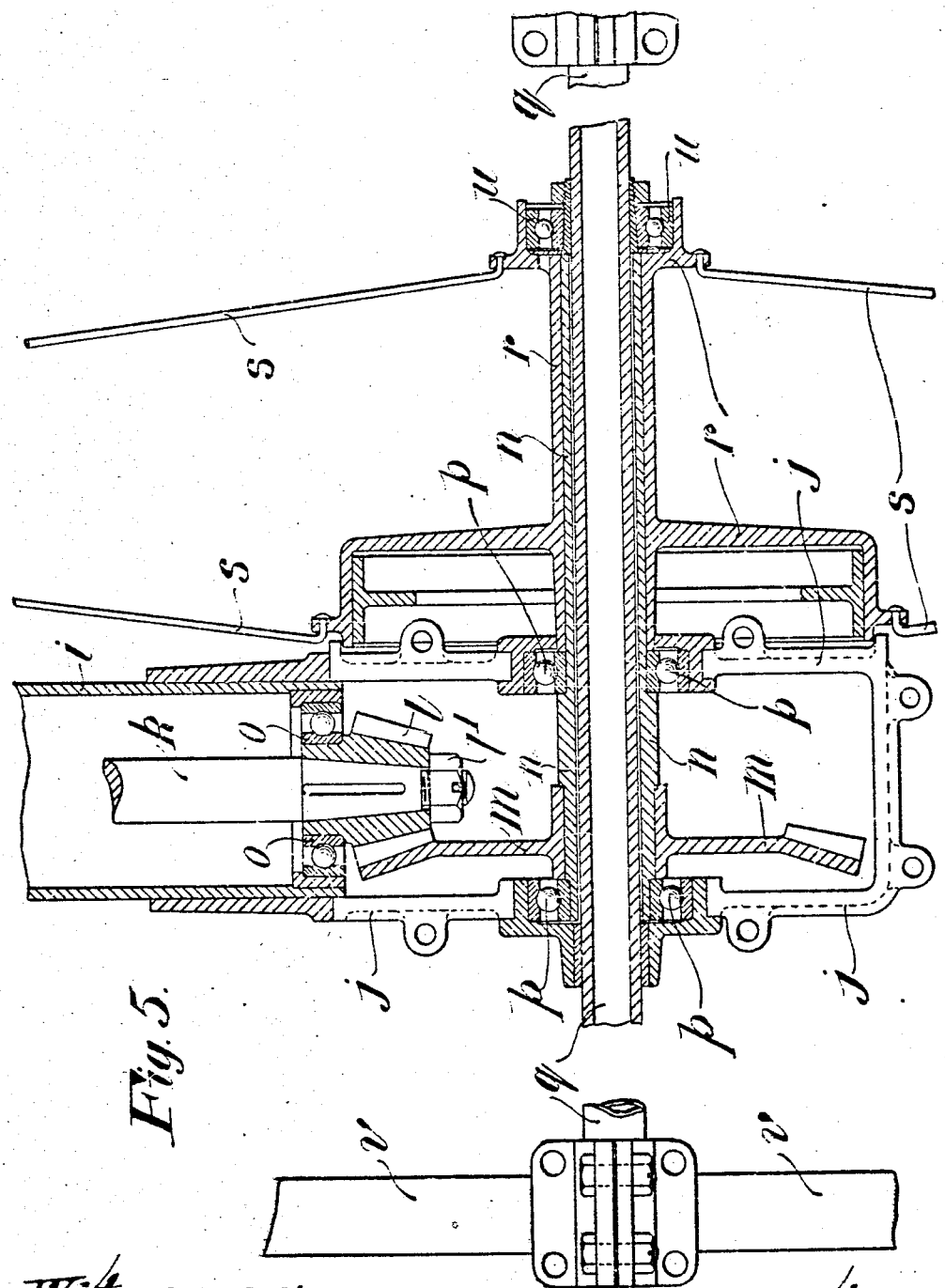

In order that my said invention may be properly understood I have hereunto appended five explanatory sheets of drawings, whereon:

Figure 1 is a sectional elevation of a three wheeled car made in accordance with my invention. Fig. 2 is a plan of the same with the body removed. Fig. 3 is a side elevation of a four-wheeled car with the rear wheels removed. Fig. 4 is a sectional plan of the same with the body removed. Fig. 5 is an enlarged horizontal section of the bevel-gearing and gear box of the back axle suitable for a three-wheeled car.

In carrying out my invention, the engine $a$ is preferably placed almost over the front axle $b$ and is supported from the same by means of the springs $c$, the lower halves of which are bolted to brackets $d$ on the front axle $b$ and the upper halves bolted to brackets $e$ on a horizontal bar, $f$ passing through a bracket $g$ which is secured to or may be cast solid with the engine casing $a$. The change speed gear case $h$ is secured at one end to the engine casing $a$ and, at the other, to one end of the hollow steel tube $i$ whose other end is secured to the back axle gear case $j$. Down the center of the hollow steel tube $i$ runs a straight transmission shaft $k$ keyed at one end to a spur wheel of the change speed gear and at the other end to a bevel pinion $l$ (see Fig. 5) which gears with a bevel wheel $m$ keyed to the hollow live back axle $n$. The transmission shaft is tapered and screwed at the end to receive the bevel pinion, which, after being keyed up, can be further secured by the nut $l'$. The live back axle $n$ is carried in ball bearings $p$ and the transmission shaft $k$ in ball bearings $o$ in the gear case $j$ the latter being secured to the stationary hollow back axle $q$. The hub $r$, to which are attached the spokes $s$ of the back wheel $t$, is keyed to the hollow live axle $n$ and provided with the bearing $u$. The body $y$ of the car is preferably supported, at the front, by the same springs $c$ as the engine and, at the back, by the springs $v$ on the back axle.

In the case of a four wheeled car the engine is preferably supported from the front axle $b$ by a lateral spring $c$ and instead of one hollow steel transmission tube I preferably use two, one fitted within the other. The outside tube $i$ is rigidly secured to the back axle gear box and loosely fitted to the change speed gear box, while the inside tube $i'$ is rigidly secured to the change speed gear box and loosely fitted to the back axle gear box. This arrangement, although not allowing any end play, yet allows both tubes to revolve round each other for a certain distance and thus both axles can take up different angles relatively to one another due to inequalities in the surface of the road. The transmission shaft k runs down the center of the tubes and transmits the power to the back axle through bevel gearing as before. The tubes are supported by the stays w and the engine casing by the stays x.

All the working parts of the transmission gear are and in fact the entire system is or may be inclosed in oil-tight cases or tubes.

When the transmission system is arranged in this manner, the rise and fall of the back wheel or wheels practically takes place round the engine as a pivot so that the movement of the back axle is inappreciable at the engine end. As the body of the car is not rigidly connected to the engine in any way the vibration of the latter is not felt by the occupants of the car and the body can be made much lighter in structure without an expensive and separate frame. It may, if desired, be made entirely of wood.

Having now fully described my invention, what I claim and desire to secure by Letters Patent is:—

1. In a motor car the combination with the front axle of a motor pivotally supported thereon, gear for driving the back axle, a shaft directly connecting said gear with the gear of the motor, a tube surrounding said shaft, a second tube arranged outside of the first one, the one tube being fixed at its front end and free at its rear end while the other is fixed at its rear end and free at its front end in order that the wheel axles may take up different angles relatively with one another and to the horizontal.

2. In a motor car the combination with the front axle, of a motor pivotally supported thereon, lateral supports for the motor, driving gear on the back axle, a shaft extending from the motor and driving said gear, a tube surrounding said shaft which tube is fixed at its front end and free at its rear end, and a second tube outside the first which is fixed at its rear end and free at its front end 3. In a motor car the combination with the front axle, of a motor pivotally supported thereon, a gear case extending from the rear of the motor, lateral supports for said gear case, a tube extending rearwardly from the gear case, a shaft arranged within said tube, gearing on the back axle driven by said shaft, a gear case for said gear, a tube secured to said case and extending forwardly and lateral stays connected with the front end of the said tube.

In testimony whereof I affix my signature in presence of two witnesses.

JAMES THOMAS HEPBURN.

Witnesses:
WILLIAM FLEMING,
JAMES AIKEN.